Patented Sept. 25, 1951

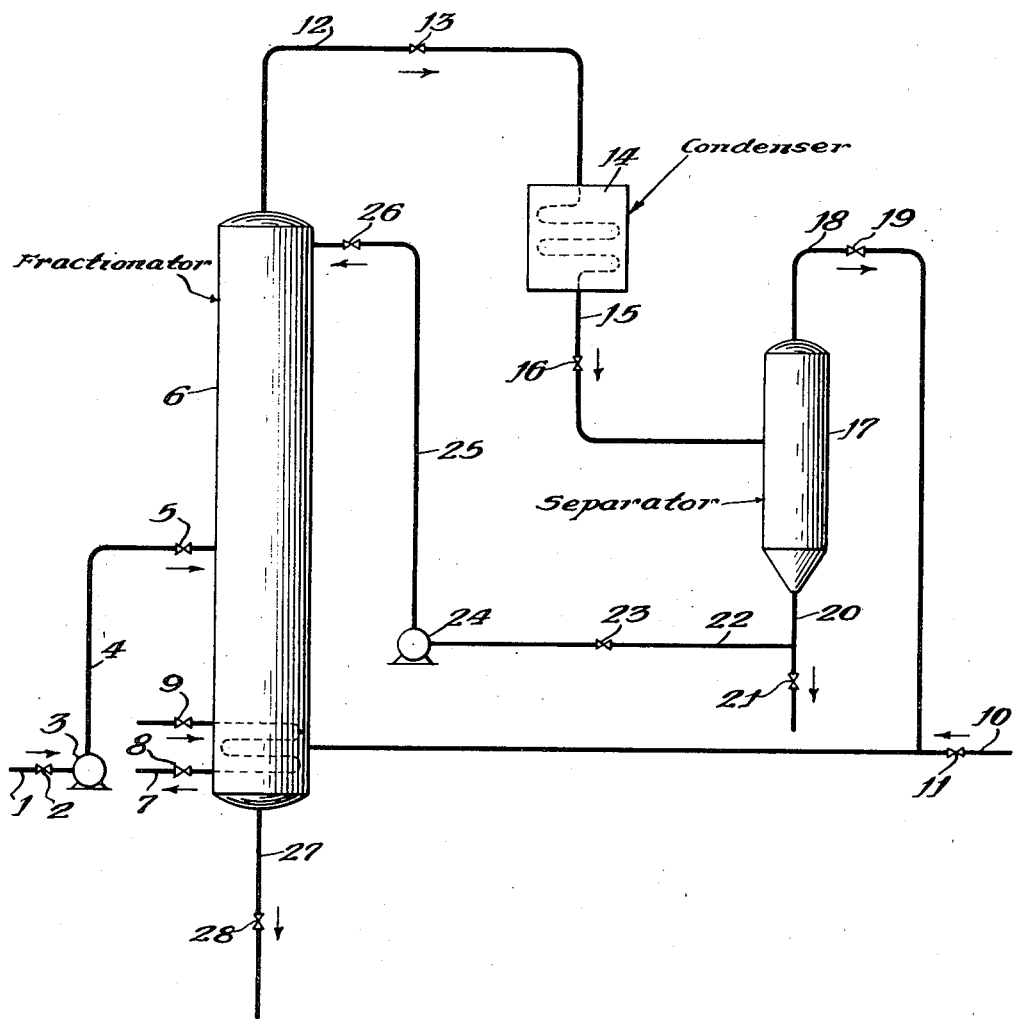

2,568,889

UNITED STATES PATENT OFFICE 2,568,889

METHOD FOR CONCENTRATING HYDROGEN FLUORIDE

Olaf M. Hanson, Chicago, and Carl B. Linn, Riverside, Ill., assignors to Universal Oil Products Company, Chicago, Ill., a corporation of Delaware Application February 27, 1947, Serial No. 731,398

2 Claims. (Cl. 202—57)

This invention relates to a method for concentrating hydrogen fluoride from aqueous solutions of hydrogen fluoride and particularly from a constant boiling mixture of hydrogen fluoride and water.

An object of this invention is to produce hydrofluoric acid of higher hydrogen fluoride concentration from an aqueous solution of hydrogen fluoride.

Another object of this invention is to produce hydrofluoric acid of from about 90 to about 100% hydrogen fluoride concentration from hydrogen fluoride-water azeotrope.

One specific embodiment of this invention relates to a process for concentrating hydrofluoric acid which comprises contacting an aqueous solution of hydrogen fluoride with substantially anhydrous hydrogen chloride to form a more concentrated hydrofluoric acid and aqueous hydrogen chloride, and separating said more concentrated hydrofluoric acid from said aqueous hydrogen chloride.

Another embodiment of this invention relates to a method for concentrating hydrofluoric acid from its constant boiling mixture with water which comprises contacting said constant boiling mixture with sufficient substantially anhydrous liquid hydrogen chloride to form an upper more concentrated hydrofluoric acid layer and a lower aqueous hydrogen chloride layer, separating the upper layer and lower layer, and fractionally distilling the upper, more concentrated hydrofluoric acid layer in the presence of substantially anhydrous hydrogen chloride to obtain a distillate comprising essentially hydrofluoric acid of 90 to 100% hydrogen fluoride concentration.

A further embodiment of this invention relates to a process for producing a more concentrated hydrofluoric acid from its constant boiling mixture with water which comprises distilling the constant boiling hydrofluoric acid mixture in the presence of added substantially anhydrous hydrogen chloride and recovering the distillate boiling higher than anhydrous hydrogen chloride and comprising the more concentrated hydrofluoric acid.

In a still further embodiment of this invention, a constant boiling mixture of hydrogen fluoride and water is distilled in the presence of continuously added, substantially anhydrous hydrogen chloride, an overhead fraction is separated comprising essentially hydrogen fluoride and hydrogen chloride, and said hydrogen fluoride is recovered.

This process for concentrating hydrogen fluoride is effected by taking advantage of the immiscibility of anhydrous liquid hydrogen fluoride with the other liquefied hydrogen halides and of the affinity for water of all of the hydrogen halides. Our process is carried out by what might be termed a solvent extraction as such or combined with distillation.

Simple fractional distillation can be used to produce substantially anhydrous hydrogen fluoride from hydrofluoric acid of a hydrogen fluoride concentration higher than that of the constant boiling mixture with water (boiling point about 111° C. at 1 atmosphere) which contains about 38% by weight of hydrogen fluoride, but heretofore no simple method has been available for concentrating hydrogen fluoride from its constant boiling aqueous solution. Also simple distillation may be used to produce constant boiling hydrofluoric acid from more dilute aqueous solutions of hydrogen fluoride. We have found that hydrofluoric acid containing at least 90% by weight of hydrogen fluoride can be obtained by treating an aqueous solution of hydrogen fluoride with substantially anhydrous hydrogen chloride. The hydrogen chloride as either a liquid or vapor is contacted with the aqueous hydrofluoric acid to liberate hydrofluoric acid of higher hydrogen fluoride concentration.

The use of our method makes it possible to recover hydrofluoric acid of high hydrogen fluoride concentration from aqueous solutions and sludges that previously could not be concentrated easily and economically and that contained sufficient hydrogen fluoride to present serious disposal problems. These dilute solutions and sludges could be neutralized with caustic soda or by other means but the resultant sodium fluoride is also difficult to dispose of because of hazards to public health, fish, game, and the like, that prevail if these wastes are dumped into rivers, lakes, and other sources of water supplies.

Our process for removing water from aqueous solutions of hydrofluoric acid may be carried out by adding liquid anhydrous hydrogen chloride, vaporized anhydrous hydrogen chloride, or both liquid and vaporized hydrogen chloride to an aqueous hydrofluoric acid solution, that is to constant boiling hydrofluoric acid or to another solution in water containing either more or less hydrogen fluoride than that present in the constant boiling hydrofluoric acid. Thus the hydrogen fluoride-water azeotrope, also referred to as the constant boiling mixture of hydrogen fluoride and water, is agitated with liquid anhydrous hydrogen chloride whereby more of the water leaves the hydrogen fluoride-water phase and enters the hydrogen chloride phase. For efficient operation a substantially larger volume of liquid hydrogen chloride should be used than the volume of hydrofluoric acid being treated in order to prevent the three component systems from forming a single liquid phase.

This process may be carried out as a liquid-liquid extraction at a temperature as low as the freezing point of the aqueous hydrogen fluoride solution that is extracted by substantially anhydrous hydrogen chloride. Depending upon the exact temperature used it may be necessary to carry out the extraction at a superatmospheric pressure in order to maintain the hydrogen chloride in substantially liquid phase. It is preferable to carry out the extraction at the autogenous pressure developed by the hydrogen chloride and hydrogen fluoride present in the hydrogen fluoride-concentrating system, although higher pressures may also be used. Constant boiling hydrofluoric acid freezes at about −35° C. while anhydrous hydrogen fluoride freezes at about −83° C. The freezing point of other hydrogen fluoride-water mixtures may be noted from the approximately straight line curve obtained by plotting the composition versus freezing point based upon the above indicated values and the freezing point of pure water.

After the mixture of liquid hydrogen chloride and aqueous hydrofluoric acid are contacted, the resultant mixture is passed to a settling chamber where the heavier hydrogen chloride layer enriched by much of the water introduced with the hydrofluoric acid is withdrawn from the upper hydrofluoric acid layer which is thereby freed from much of its original water content. In order to produce hydrofluoric acid of still higher hydrogen fluoride concentration, the upper layer obtained in the aforementioned separation may be treated in a second extraction stage with an additional quantity of liquid anhydrous hydrogen chloride, the resultant aqueous hydrogen chloride layer is separated from the upper hydrofluoric acid layer containing a relatively high concentration of hydrogen fluoride which may be used as such in catalyzing organic reactions or for other purposes or this concentrated hydrofluoric acid which contains a higher proportion of hydrogen fluoride than present in the constant boiling hydrofluoric acid may be subjected to distillation to separate substantially anhydrous hydrogen fluoride as an overhead fraction from a distillation residue comprising essentially a constant boiling hydrogen fluoride-water mixture.

When concentrating hydrofluoric acid by distillation in the presence of hydrogen chloride, the maximum temperature in a still operated at a pressure of one atmosphere is substantially that of the boiling point of constant boiling hydrochloric acid or of constant boiling hydrofluoric acid, that is, a temperature near 110° C. The minimum temperature, which would be found near the top of the fractionating column is near to or below the boiling point of pure hydrogen fluoride, that is, about 20° C.

We have also found that hydrofluoric acid of relatively high hydrogen fluoride concentration may be obtained by treating an aqueous solution of hydrogen fluoride with vaporized anhydrous hydrogen chloride. This method of removing water from aqueous solutions of hydrogen fluoride is illustrated diagrammatically in the attached drawing which illustrates one method by which this embodiment of our invention may be carried out.

An aqueous solution of hydrogen fluoride from which water is to be removed is directed through line 1 and valve 2 to pump 3 which discharges through line 4 and valve 5 into fractionator 6 provided with reboiler coil 7 containing valves 8 and 9, and receiving heat from a source not illustrated in the drawing. Substantially anhydrous hydrogen chloride is also introduced from an outside source through line 10 and valve 11, together with hydrogen chloride recycled in the process, to near the bottom of fractionator 6 which is maintained at conditions of temperature and pressure sufficient to cause the continuous discharge of a mixture of relatively dry hydrogen fluoride and hydrogen chloride from the top of this fractionating zone. The mixture of hydrogen fluoride and hydrogen chloride so separated in fractionator 6 is directed therefrom through line 12 and valve 13 to condenser 14 in which the hydrogen fluoride is liquefied and from which the mixture of liquid hydrogen fluoride and gaseous hydrogen chloride are directed through run down line 15 and valve 16 to separator 17.

In separator 17 the liquefied hydrofluoric acid is separated from substantially dry hydrogen chloride vapors, the latter being discharged from separator 17 through line 18 and valve 19 into line 10 through which fresh hydrogen chloride is introduced continuously from an outside source as hereinabove set forth. It may also be desirable to connect a compressor to line 18 to assist in recycling the hydrogen chloride through line 10. From the bottom of separator 17, liquid hydrofluoric acid is withdrawn through line 20 containing valve 21 to storage or to further use not illustrated in the diagrammatic drawing. A portion of the liquid hydrofluoric acid being discharged through line 20 is directed therefrom through line 22 and valve 23 to pump 24 which discharges through line 25 and valve 26 into the top of fractionator 6, said liquid hydrofluoric acid being thus employed to supply fractionating reflux and to assist in controlling the fractionation temperature within fractionator 6.

While a mixture of substantially dry hydrogen chloride and hydrofluoride acid is discharged from the top of fractionator 6, through line 12 as already mentioned, an aqueous hydrogen chloride mixture accumulates in the lower portion of fractionator 6 and is discharged therefrom either intermittently or continuously through line 27 containing valve 28 to other use not illustrated in the drawing. This aqueous solution of hydrogen chloride may also contain small amounts of hydrogen fluoride.

By this means the constant boiling mixture of hydrogen fluoride and water which contains about 38% by weight of hydrogen fluoride can be treated to yield liquid hydrofluoric acid containing from about 90 to about 100% by weight of hydrogen fluoride admixed with up to about 10% by weight of water. The water present in the constant boiling hydrofluoric acid is withdrawn from the concentrating equipment in the form of an aqueous solution of hydrogen chloride, sometimes containing minor amounts of hydrogen fluoride.

The nature of the present invention and results obtained thereby are indicated further by the following example which should not be construed to limit the broad scope of the invention.

A hydrofluoric acid solution consisting of 295 grams of hydrogen fluoride and 540 grams of water (35.3% hydrogen fluoride concentration) was placed in a copper distilling vessel provided with a copper distilling column packed with copper turnings and fitted with a water cooled copper distilling head, a copper discharge line, condenser and receiver, the latter cooled to −78° C. by solid carbon dioxide. The top of the distilling column was cooled to 5° C. by circulating ice water and then anhydrous hydrogen chloride was continuously passed into the 35% aqueous hydrofluoric acid solution in the distilling vessel which was mildly heated by an electric heater. From the mixture of vapors which passed overhead, hydrofluoric acid was condensed in the copper receiver cooled by solid carbon dioxide, while the hydrogen chloride gas was discarged. An overhead fraction of 25 grams was thus collected in the copper receiver while a total of 152 grams of anhydrous hydrogen chloride was passed into the aqueous hydrogen fluoride solution. Analysis of the 25 gram sample of the overhead fraction showed it contained 90.9% by weight of hydrogen fluoride, 0.3% of hydrogen chloride, and 8.8% of water.

An additional quantity of 209 grams of hydrogen chloride was then passed into the copper vessel containing the remainder of the aqueous hydrogen fluoride solution and an overhead fraction of 20 grams of condensate was collected. Analysis of this overhead condensate fraction showed it to contain 62.5% by weight of hydrogen fluoride, 6.5% of hydrogen chloride, and 31.0% by weight of water.

After the second fraction was collected, the aqueous hydrogen fluoride solution which remained in the distilling vessel contained 27.6% by weight of hydrogen fluoride, 7.4% of hydrogen chloride, and 66.0% of water.

These experimental results show that the passage of dry hydrogen chloride into the water-hydrogen fluoride azeotropic mixture made it possible to take overhead a highly concentrated hydrogen fluoride fraction.

The first fraction of the overhead was nearly free from hydrogen chloride. The hydrogen chloride gas used in excess of that combining with water could be recovered nearly pure by separating hydrogen chloride vapors from liquid hydrogen fluoride at the top of the column and was suitable for recycling to the distillation zone.

The process may also be operated at a superatmospheric pressure. It is sometimes desirable to have the pressure sufficiently high that the hydrogen chloride in the overhead fraction separates out as a liquid phase which is immiscible with the substantially anhydrous hydrogen fluoride phase also derived from the overhead fraction.

It is also possible to use hydrogen bromide or hydrogen iodide instead of hydrogen chloride to thus dehydrate aqueous hydrogen fluoride. However, the cost of hydrogen bromide or hydrogen iodide would probably make their use unprofitable.

The nature of the present invention and type of results obtained thereby are evident from the preceding specification and examples although neither section should be construed to limit unduly the generally broad scope of the invention.

We claim as our invention:

1. A process for recovering hydrogen fluoride from a solution consisting essentially of hydrogen fluoride and water, which comprises distilling said solution in a distilling zone while introducing a stream of substantially anhydrous hydrogen chloride, maintaining said zone at conditions of temperature and pressure to cause the discharge therefrom of a relatively dry vaporous mixture of hydrogen fluoride and hydrogen chloride, cooling said mixture to liquefy the hydrogen fluoride, and separating the liquefied hydrogen fluoride from the hydrogen chloride.

2. The process of claim 1 further characterized in that said solution is a constant boiling mixture of hydrogen fluoride and water.

OLAF M. HANSON.
CARL B. LINN.

REFERENCES CITED

The following references are of record in the file of this patent:

UNITED STATES PATENTS

| Number | Name | Date |
|---|---|---|
| 2,345,696 | Benning | Apr. 4, 1944 |
| 2,355,857 | Hachmuth | Aug. 15, 1944 |
| 2,413,205 | Word | Dec. 24, 1946 |

FOREIGN PATENTS

| Number | Country | Date |
|---|---|---|
| 357,438 | Great Britain | Sept. 24, 1931 |